US012063706B2

(12) United States Patent
Buthler et al.

(10) Patent No.: US 12,063,706 B2
(45) Date of Patent: Aug. 13, 2024

(54) LOGICAL CHANNEL SELECTION FOR NON-DISCONTINUOUS RECEPTION ENABLED DEVICES

(71) Applicant: NOKIA TECHNOLOGIES OY, Espoo (FI)

(72) Inventors: Jakob Lindbjerg Buthler, Aalborg (DK); Berthold Panzner, Holzkirchen (DE); Rudraksh Shrivastava, Erligheim (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 373 days.

(21) Appl. No.: 17/558,154

(22) Filed: Dec. 21, 2021

(65) Prior Publication Data

US 2023/0199901 A1   Jun. 22, 2023

(51) Int. Cl.
*H04W 76/28* (2018.01)
*H04W 48/18* (2009.01)
*H04W 92/18* (2009.01)

(52) U.S. Cl.
CPC ........... *H04W 76/28* (2018.02); *H04W 48/18* (2013.01); *H04W 92/18* (2013.01)

(58) Field of Classification Search
CPC ...... H04W 76/28; H04W 48/18; H04W 92/18
USPC ........................................................ 370/329
See application file for complete search history.

(56) References Cited

U.S. PATENT DOCUMENTS

| 11,910,361 B2 * | 2/2024 | Ashraf | H04W 72/20 |
| 2022/0201528 A1 * | 6/2022 | Shin | H04L 5/005 |
| 2023/0115633 A1 * | 4/2023 | Park | H04W 72/232 |
| | | | 370/311 |
| 2023/0247718 A1 * | 8/2023 | Ji | H04L 1/1887 |

FOREIGN PATENT DOCUMENTS

| WO | WO-2021034966 A1 * | 2/2021 | H04W 24/08 |
| WO | WO-2021182916 A1 * | 9/2021 | H04L 1/1607 |

OTHER PUBLICATIONS

3GPP TS 38.321, V16.6.0 (Sep. 2021), 3rd Generation Partnership Project; Technical Specification Group Radio Access Network; NR; Medium Access Control (MAC) protocol specification (Release 16), 158 pages.

* cited by examiner

*Primary Examiner* — Anthony Mejia
(74) *Attorney, Agent, or Firm* — SQUIRE PATTON BOGGS (US) LLP (57) ABSTRACT

Systems, methods, apparatuses, and computer program products for logical channel selection for non-discontinuous reception (non-DRX) enabled devices. A method may include determining a sidelink discontinuous reception state of at least one receiving user equipment. The method may also include examining one or more conditions associated with the at least one receiving user equipment. The method may further include selecting at least one sidelink destination related to a logical channel among the at least one receiving user equipment based on the determined sidelink discontinuous reception state and the examination.

20 Claims, 4 Drawing Sheets

LOGICAL CHANNEL SELECTION FOR NON-DISCONTINUOUS RECEPTION ENABLED DEVICES

FIELD

Some example embodiments may generally relate to mobile or wireless telecommunication systems, such as Long Term Evolution (LTE) or fifth generation (5G) new radio (NR) access technology, or other communications systems. For example, certain example embodiments may relate to apparatuses, systems, and/or methods for logical channel selection for non-discontinuous reception (non-DRX) enabled devices.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Some example embodiments may be directed to a method. The method may include determining a sidelink discontinuous reception state of at least one receiving user equipment. The method may also include examining one or more conditions associated with the at least one receiving user equipment. The method may further include selecting at least one sidelink destination related to a logical channel among the at least one receiving user equipment based on the determined sidelink discontinuous reception state and the examination.

Other example embodiments may be directed to an apparatus. The apparatus may include at least one processor and at least one memory including computer program code. The at least one memory and computer program code may also be configured to, with the at least one processor, cause the apparatus at least to determine a sidelink discontinuous reception state of at least one receiving user equipment. The apparatus m ay also be caused to examine one or more conditions associated with the at least one receiving user equipment. The apparatus may further be caused to select at least one sidelink destination related to a logical channel among the at least one receiving user equipment based on the determined sidelink discontinuous reception state and the examination.

Other example embodiments may be directed to an apparatus. The apparatus may include means for determining a sidelink discontinuous reception state of at least one receiving user equipment. The apparatus may also include means for examining one or more conditions associated with the at least one receiving user equipment. The apparatus may further include means for selecting at least one sidelink destination related to a logical channel among the at least one receiving user equipment based on the determined sidelink discontinuous reception state and the examination.

In accordance with other example embodiments, a non-transitory computer readable medium may be encoded with instructions that may, when executed in hardware, perform a method. The method may include determining a sidelink discontinuous reception state of at least one receiving user equipment. The method may also include examining one or more conditions associated with the at least one receiving user equipment. The method may further include selecting at least one sidelink destination related to a logical channel among the at least one receiving user equipment based on the determined sidelink discontinuous reception state and the examination.

Other example embodiments may be directed to a computer program product that performs a method. The method may include determining a sidelink discontinuous reception state of at least one receiving user equipment. The method may also include examining one or more conditions associated with the at least one receiving user equipment. The method may further include selecting at least one sidelink destination related to a logical channel among the at least one receiving user equipment based on the determined sidelink discontinuous reception state and the examination.

Other example embodiments may be directed to an apparatus that may include circuitry configured to determine a sidelink discontinuous reception state of at least one receiving user equipment. The apparatus may also include circuitry configured to examine one or more conditions associated with the at least one receiving user equipment. The apparatus may further include circuitry configured to select at least one sidelink destination related to a logical channel among the at least one receiving user equipment based on the determined sidelink discontinuous reception state and the examination.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for logical channel selection for non-DRX enabled devices.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably. Additionally, the term "SL DRX may be referred to as "PC5-DRX".

According to 3rd Generation Partnership Project (3GPP), sidelink discontinuous reception (SL DRX) may relate to SL user equipments (UEs) connecting through unicast, groupcast, or broadcast. Upon connection establishment, whether or not to utilize SL DRX may be negotiated during UE capability transfer/connection setup, as unicast is a logical 1-to-1 connection. However, when transmitting with groupcast or broadcast, the UE may have multiple recipients, which means that the negotiation may not be trivial. Although this may impact non SL DRX capable UEs and SL DRX capable UEs (i.e., if the non SL DRX capable UE is the transmitter and transmits outside the SL DRX capable active time), a capability/compatibility indicator (i.e., Tx profile) may be used to handle such backwards compatibility issues between SL DRX enabled UEs and SL UEs that are not enabled with SL DRX. Use of Tx profiles may result in disabling the SL DRX feature in groupcast/broadcast connections where only one of the multiple connected UEs does not support SL DRX. Thus, to address such issues, certain example embodiments may effectively handle multiple groupcast transmission with different source/destination pairs from the same UE, but with different values/configurations of the Tx profile provided by the peer(s).

3GPP also describes selection of the destinations based on the highest prioritized logical channel (LCH) which has data and fits within the conditions of the SL grant. With the selection of LCHs, a medium access control (MAC) entity may, for each SL control information (SCI) corresponding to a new transmission, select a destination associated to one of unicast, groupcast, and broadcast. The destination may have at least one of the MAC control element (CE) and the LCH with the highest priority among the LCHs that satisfy certain conditions and MAC CE(s), if any, for the SL grant associated to the SCI. Such conditions may include, for example, whether SL data is available for transmission, and whether SBj>0, in case there is any LCH having LBj>0. The conditions may also include sl-configuredGrantType1Allowed, if configured, is set to true in case the SL grant is a Configured Grant Type 1, sl-AllowedCG-List, if configured, includes the configured grant index associated to the SL grant, and sl-HARQ-FeedbackEnabled is set to disabled, if physical sidelink feedback channel (PSFCH) is not configured for the SL grant associated to the SCI. If multiple destinations have the LCHs satisfying all conditions above, the same highest priority, or if multiple destinations have either the MAC CE and/or the LCHs satisfying all conditions above with the same priority as the MAC CE, which destination is selected among them may be up to UE implementation.

Alternatively, when the MAC entity for each SCI corresponding to a new transmission, the MAC entity may select the LCHs satisfying certain conditions among LCHs belonging to the selected destination. The conditions may include, for example, whether SL data is available for transmission, sl-configuredGrantType1Allowed, if configured, is set to true in case the SL grant is a Configured Grant Type 1, and sl-AllowedCG-List, if configured, includes the configured grant index associated to the SL grant. Additionally, if PSFCH is configured for the SL grant associated to the SCI, sl-HARQ-FeedbackEnabled may be set to enabled, if sl-HARQ-FeedbackEnabled is set to enabled for the highest priority logical channel satisfying the above conditions, or sl-HARQ-FeedbackEnabled is set to disabled, if sl-HARQ-FeedbackEnabled is set to disabled for the highest priority logical channel satisfying the above conditions. Otherwise, sl-HARQ-FeedbackEnabled is set to disabled.

Although 3GPP provides certain methods to select LCHs, such methods result in issues including, for example, that destinations with SL DRX enabled have a bounded time period in which the UE(s) can receive data, whereas destinations with SL DRX disabled do not. Assuming that one has a high priority logical channel (LCH1) with, for example, a larger data transmission/reception timeframe (i.e., larger delay budget/latency bound indicating the latest time in which the data is supposed to arrive or be transmitted) belonging to a destination where SL DRX is not enabled, and a lower priority logical channel (LCH2) with, for example, a lower packet delay budget but SL DRX enabled, LCH1 may take precedence over LCH2. This may be true even though LCH1 may be transmitted in a later timeframe but still well within the data transmission/reception timeframe, as the destination has no SL DRX.

Figure 1A:
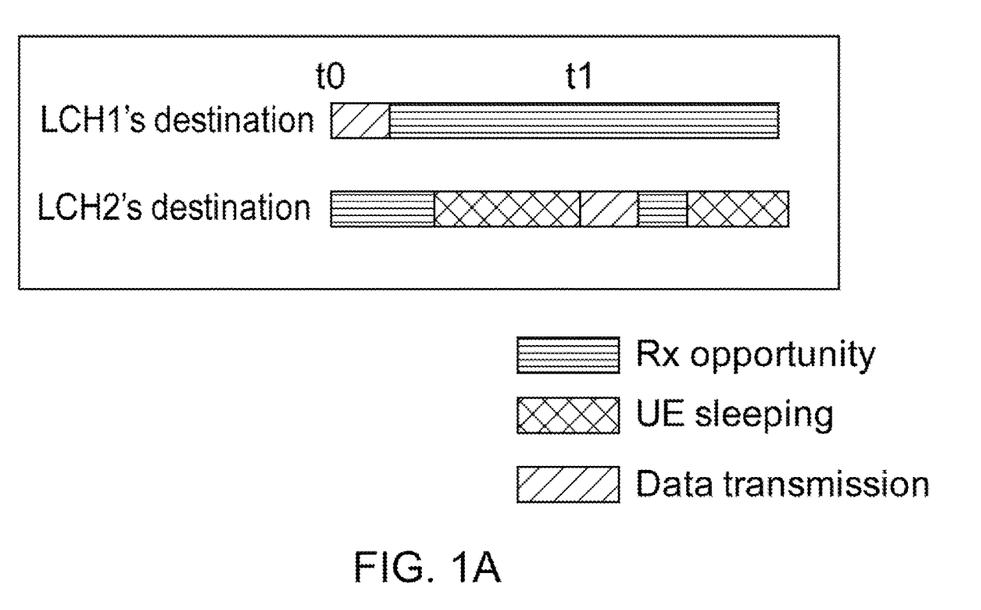
FIG. 1A illustrates an example data transmission behavior.
Figure 1B:
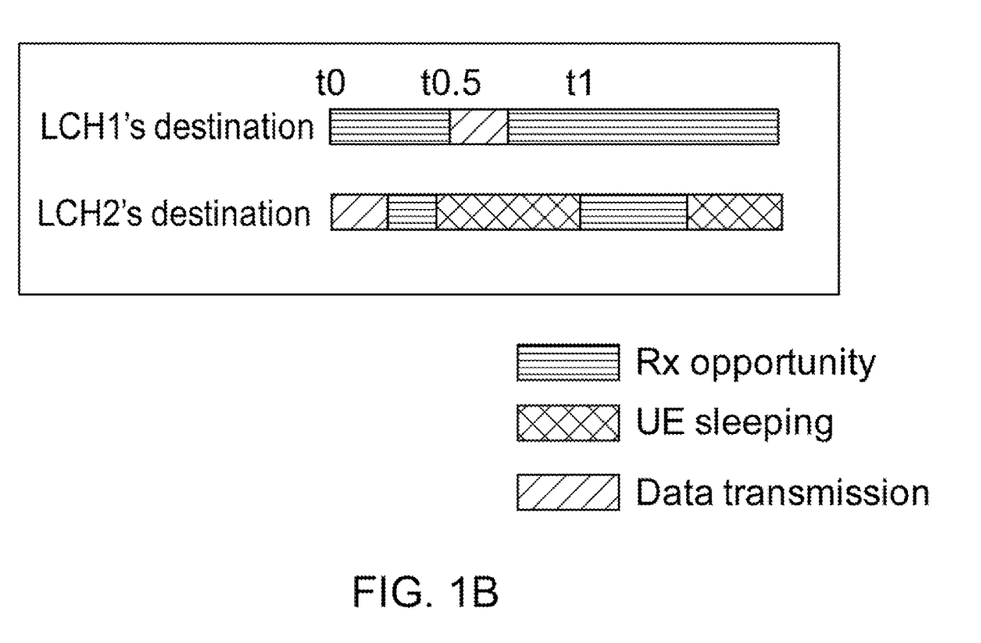
FIG. 1B illustrates another example data transmission behavior.

FIG. 1A illustrates an example data transmission behavior, and FIG. 1B illustrates another example data transmission behavior. As illustrated in FIG. 1A, both LCH1 and LCH2 have data ready at t0. However, since LCH1 has a higher priority, this is selected as the destination, causing LCH2's data to wait until t1. The procedure illustrated in FIG. 1A is suboptimal, as with a smarter destination selection, LCH2's data could be sent at t0, and LCH1's data could be sent in another grant at, for example t0.5, before t1. Additionally, as illustrated in FIG. 1B, a more efficient usage of the active time of the SL DRX enabled UEs is provided while still enabling all SL data to be transmitted within the required latency bound.

According to certain example embodiments, a destination may be denoted as having a priority for reception when the highest priority logical channel is related to that given destination. This may be due to the destination selection being based on the LCH with the highest priority. According to other example embodiments, an extra path of decision within, for example, the destination selection of SL specification may be added. This may ensure optimal usage of the SL DRX enabled UE's active time (not prolonging it unnecessarily by the SL DRX inactivity timer), while still allowing for high priority data to be transmitted timely. In certain example embodiments, this may be accomplished by checking the latency bound (i.e., packet delay budget) of the data to a potentially higher priority non SL DRX enabled destination(s), as well as the priority and latency bound for the SL DRX enabled destination(s). In some example embodiments, when the Tx UE is SL DRX capable, and has at least one groupcast or broadcast transmission with a SL DRX enabled (i.e., indicated by the Tx profile) destination, several solutions may be applied to achieve the desired scenario. However, in some example embodiments, the solutions may relate to the general concept of ensuring priority for SL DRX enabled transmissions within the destination(s) active-time when this is allowed by different conditions of, for example, higher priority transmissions.

Figure 2:
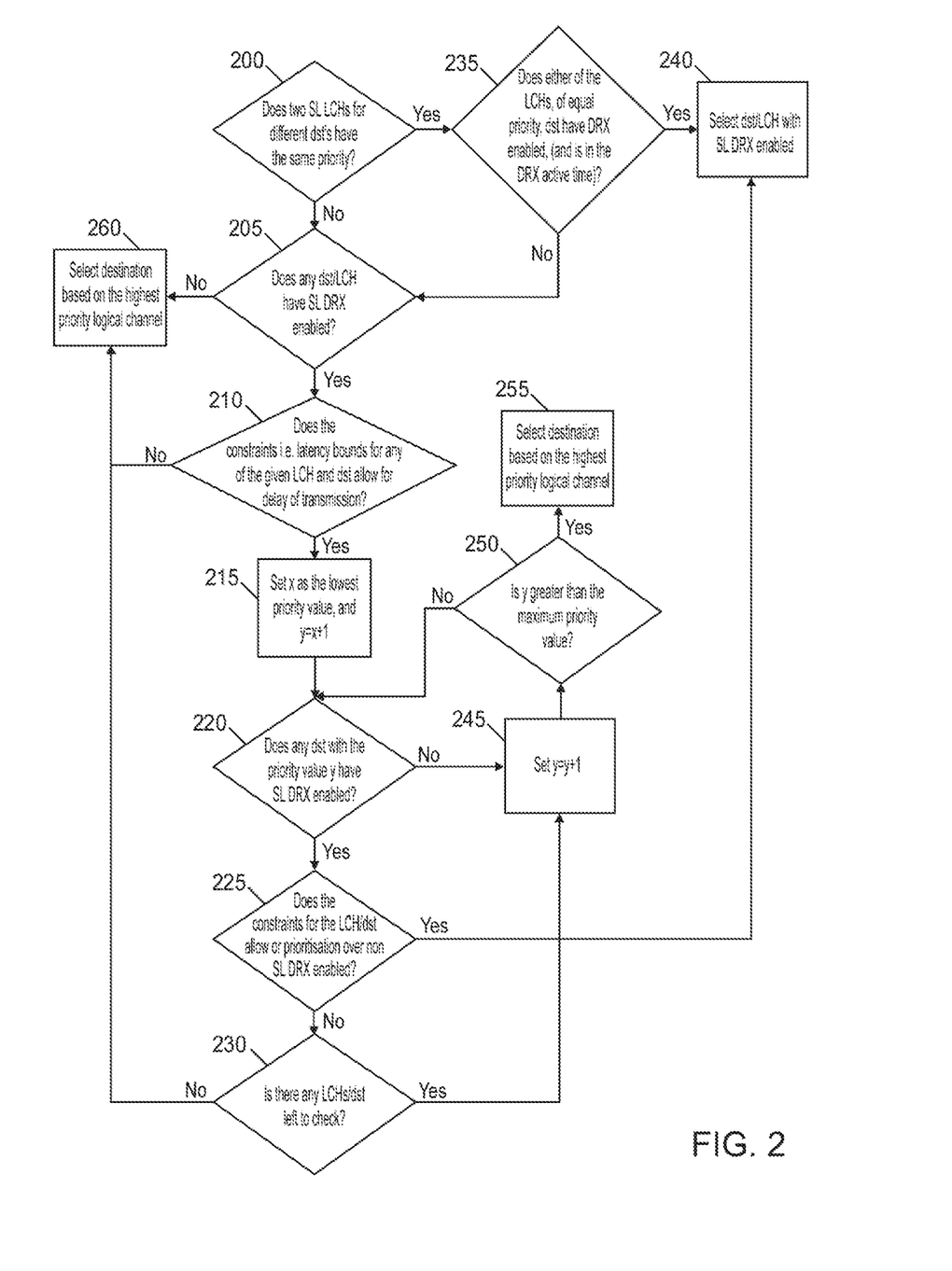
FIG. 2 an example flow diagram of a method, according to certain example embodiments.

FIG. 2 illustrates an example flow diagram of a method, according to certain example embodiments. In particular, according to some example embodiments, the actions illustrated in FIG. 2 may be performed within the Tx UE as part of the LCH selection. As illustrated in FIG. 2, the flow diagram includes several "test" procedures/conditions (i.e., 200, 205, 210, 220, 225, 230, 235, or 250) to which certain constraints may be applied. However, the flow diagram is not limited to the direction illustrated in FIG. 2, and according to certain example embodiments, the conditions may be omitted, or placed elsewhere in the flow, or may be used together in any combination or separately. As illustrated in FIG. 2, at 200, a determination may be made as to whether two SL LCHs for different destinations have the same priority. At 205, if the SL LCHs do not have the same priority, a determination may be made as to whether any destination/LCH has SL DRX enabled. If so, at 210, a further determination may be made as to whether any constraint(s) (i.e., latency bounds for any of the given LCH and destination) allow for delay of transmission. If yes, at 215, x may be set as the lowest priority value, and y=x+1 may be provided. Specifically, in certain example embodiments, the priority of an LCH may be indicated by a value, with the higher value meaning lower priority. In doing so, it may be possible to go through the LCHs in order of decreasing priority (i.e., increasing priority value). According to certain example embodiments, x may represent the lowest priority value for all the LCHs within a set of LCHs to be selected from. Further, y may represent an iterator, which may be initially set as the second highest priority (lowest value plus one) to check whether any lower priority channels should/may/can be prioritized. As shown above, y may be increased in a stepwise manner as to further check lower priority logical channels for whether they can/may take priority over the higher priority LCHs within the selection.

At 220, a determination may be made as to whether any destination(s) with the priority value y has SL DRX enabled. If so, at 225, another determination may be made as to whether the constraint(s) for the LCH/destination allow for prioritization over non SL DRX enabled destinations. According to certain example embodiments, each LCH may have an associated destination, where multiple LCHs may have the same destination. Although in some example embodiments the LCH with the highest priority may determine the destination, in other example embodiments, the lower priority LCHs may determine the destination. If the constraint(s) does not allow for prioritization over non SL DRX enabled destinations, at 230, a determination may be made as to whether there is any LCHs/destinations left to check. If not, at 260, a destination may be selected based on the highest priority LCH. However, if there are LCHs/destinations left to check, at 245, y may be set to y=y+1. Additionally, at 250, a determination may be made as to whether y is greater than the maximum priority value. If y is greater than the maximum priority value, at 255, the destination may be selected based on the highest priority LCH.

As further illustrated in FIG. 2, if it is determined that the two SL LCHs for different destinations have the same priority, then at 235, another determination may be made as to whether either of the LCHs, of equal priority, destination have SL DRX enabled (and is in the SL DRX active time).

If so, at 240, the destination/LCH with the SL DRX enabled may be selected. If no, the flow proceed to 205 to determine whether any destination/LCH has SL DRX enabled. If it is determined that no destination/LCH has SL DRX enabled, the flow may proceed to 260 where the destination is selected based on the highest priority LCH.

According to certain example embodiments, the condition at 225 of whether to select the SL DRX enabled destination may be based on a rule to prioritize the SL DRX enabled destinations. According to other example embodiments, the condition at 225 may include whether the non SL DRX enabled destinations' quality of service (QoS) (i.e., packet delay budget or remaining packet data network (PDB)) allows for delay of transmission of the data. If the QoS parameters do not indicate whether non SL DRX enabled destinations allow for delay of transmission of the data, the non SL DRX enabled destination(s) may be prioritized. Otherwise, the SL DRX enabled destination(s) may be prioritized.

In certain example embodiments, with regard to 200, the condition may include whether the parameter for the non SL DRX enabled destination (i.e., SBj/channel busy ratio (CBR)) is above a (pre) configured threshold. If SBj for the non SL DRX enabled destination is above a certain threshold, the destination may be prioritized. In other example embodiments related to 200, the selection may be based on UE implementation as provided in 3GPP.

According to certain example embodiments, as to the constraints in 210 and 225, the constraint for whether the transmission can be delayed may relate to whether there are any known future SL grants for the transmitting UEs for which the packet delay budget may be met. According to other example embodiments, the constraint may include whether the reliability requirement may be met within the latency bound if the data is not transmitted in the current grant. This may be based on whether enough blind or HARQ feedback retransmissions can fit within future SL grants. In further example embodiments, as to the constraints in 210 and 225, the decision may be dependent on SL DRX configurations of the Tx UE. Under this scenario, if at least one groupcast/unicast is not SL DRX enabled, the Tx UE may not apply its own SL DRX configuration. In this case, it may consider the SL DRX and latency bound of SL DRX capable links and latency bound of the non SL DRX links.

In some example embodiments, with regard to the congestion control parameter of the SL DRX disabled/enabled destination, the UE(s) may be considered together or individually with the relative or absolute positioning of the target UE. If the relative or absolute position of the target US is known, it may help to, for example, reduce the probability of retransmissions. According to further example embodiments, the conditions illustrated in FIG. 2 may be applicable for the Tx UE (i.e., whether the TX UEs next active time fulfills, for example, the QoS related constraints).

Figure 3:
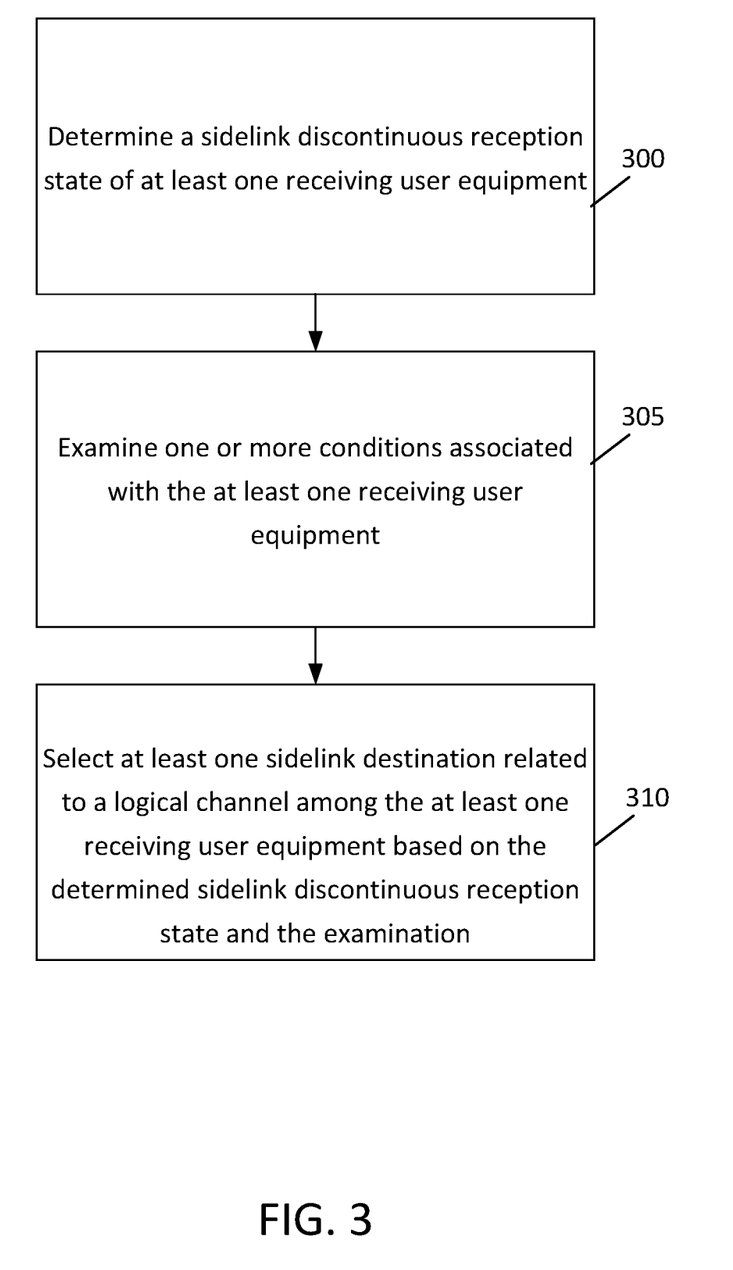
FIG. 3 illustrates an example flow diagram of another method, according to certain example embodiments.

FIG. 3 illustrates an example flow diagram of a method, according to certain example embodiments. In an example embodiment, the method of FIG. 3 may be performed by a network entity, or a group of multiple network elements in a 3GPP system, such as LTE or 5G-NR. For instance, in an example embodiment, the method of FIG. 3 may be performed by a UE similar to one of apparatuses 10 or 20 illustrated in FIG. 4.

According to certain example embodiments, the method of FIG. 3 may include, at 300, determining a SL DRX state of at least one receiving user equipment. The method may also include, at 305, examining one or more conditions associated with the at least one receiving user equipment.

The method may further include, at 310, selecting at least one sidelink destination related to a logical channel among the at least one receiving user equipment based on the determined sidelink DRX state and the examination.

In certain example embodiments, the SL DRX state comprises one of enabled or disabled. According to other example embodiments, the one or more conditions may include one or more constraints, and wherein the one or more constraints may include at least one of QoS related parameters, a priority of the at least one SL destination, or whether the at least one SL destination includes a SL DRX enabled destination or a sidelink DRX non-enabled destination. According to some example embodiments, the Qos related parameters may include at least one of a latency bound comprising whether the at least one receiving user equipment allows for delayed transmission, a packet delay budget, or a number of retransmissions.

In certain example embodiments, the examination may include determining whether logical channels have the same priority. In some example embodiments, when the logical channels have the same priority, the method may further include determining whether the at least one SL destination has SL DRX enabled, and constraints indicating prioritization. In other example embodiments, the method may also include selecting a SL destination based on the determination. According to certain example embodiments, the selection of the SL destination based on the determination comprises at least one of selection of a prioritized SL DRX enabled destination, or selection of a SL DRX non-enabled destination or a SL DRX enabled destination based on QoS parameters.

Figure 4:
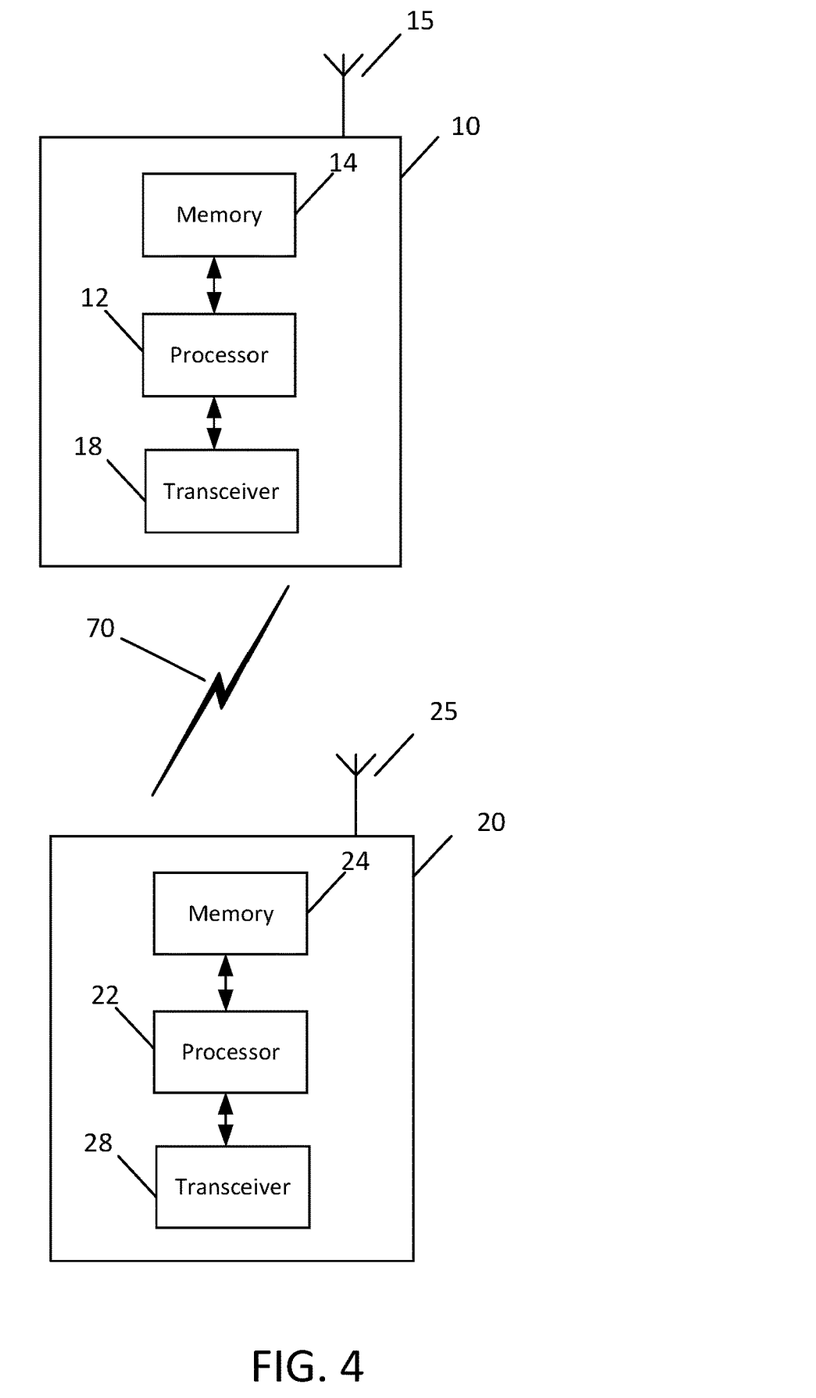
FIG. 4 illustrates a set of apparatuses, according to certain example embodiments.

FIG. 4 illustrates a set of apparatuses 10 and 20 according to certain example embodiments. In certain example embodiments, apparatus 10 may be node or element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 4.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 4.

As illustrated in the example of FIG. 4, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-3.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-3.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to determine a SL DRX state of at least one receiving user equipment. Apparatus 10 may also be controlled by memory 14 and processor 12 to examine one or more conditions associated with the at least one receiving user equipment. Apparatus 10 may further be controlled by memory 14 and processor 12 to select at least one SL destination related to a logical channel among the at least one receiving user equipment based on the determined SL DRX state and the examination.

In certain example embodiments, the apparatus 20 may be a node, core network element, or element in a communications network or associated with such a network, such as a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 4.

As illustrated in the example of FIG. 4, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes of the various example embodiments described herein.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods of the various example embodiments described herein.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for determining a SL DRX reception state of at least one receiving user equipment. The apparatus may also include means for examining one or more conditions associated with the at least one receiving user equipment. The apparatus may further include means for selecting at least one SL destination related to a logical channel among the at least one receiving user equipment based on the determined SL DRX state and the examination.

Certain example embodiments described herein provide several technical improvements, enhancements, and/or advantages. In some example embodiments, it may be possible to effectively handle multiple groupcast transmissions with different source/destination pairs from the same UE, but with different values/configurations of the Tx profile. According to other example embodiments, it may be possible to ensure optimal usage of the SL DRX enabled UE's active time, while still allowing for high priority data to be transmitted. Additionally, further example embodiments may optimize resource efficiencies by ensuring that the resources granted within the SL active are mainly used to transmit SL data in which are relevant to SL DRX enabled devices.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
5GS 5G System
BS Base Station
DRX Discontinuous Reception
eNB Enhanced Node B
gNB 5G or Next Generation NodeB
LCH Logical Channels
LTE Long Term Evolution
NR New Radio
QoS Quality of Service
RX Receiver
SL Sidelink
TX Transmitter
UE User Equipment
UL Uplink

We claim:
1. An apparatus, comprising:
at least one processor; and
at least one memory comprising computer program code,
the at least one memory and the computer program code are configured, with the at least one processor to cause the apparatus at least to
determine a sidelink discontinuous reception state of at least one receiving user equipment;

examine one or more conditions associated with the at least one receiving user equipment; and select at least one sidelink destination related to a logical channel among the at least one receiving user equipment based on the determined sidelink discontinuous reception state and the examination.

2. The apparatus according to claim 1, wherein the sidelink discontinuous reception state comprises one of enabled or disabled.

3. The apparatus according to claim 1, wherein the one or more conditions comprises one or more constraints, and wherein the one or more constraints comprises at least one of:
quality of service related parameters,
a priority of the at least one sidelink destination, or
whether the at least one sidelink destination comprises a sidelink discontinuous reception enabled destination or a sidelink discontinuous reception non-enabled destination.

4. The apparatus according to claim 3, wherein the quality of service related parameters comprise at least one of:
a latency bound comprising whether the at least one receiving user equipment allows for delayed transmission,
a packet delay budget, or
a number of retransmissions.

5. The apparatus according to claim 1, wherein the examination comprises determining whether logical channels have the same priority.

6. The apparatus according to claim 5, wherein when the logical channels have the same priority, the at least one memory and the computer program code are further configured, with the at least one processor to cause the apparatus at least to:
determine whether the at least one sidelink destination has sidelink discontinuous reception enabled, and constraints indicating prioritization.

7. The apparatus according to claim 6, wherein the at least one memory and the computer program code are further configured, with the at least one processor to cause the apparatus at least to:
select a sidelink destination based on the determination.

8. The apparatus according to claim 7, wherein the selection of the sidelink destination based on the determination comprises at least one of:
selection of a prioritized sidelink discontinuous reception enabled destination, or
selection of a sidelink discontinuous reception non-enabled destination or a sidelink discontinuous reception enabled destination based on quality of service parameters.

9. A method, comprising:
determining a sidelink discontinuous reception state of at least one receiving user equipment;
examining one or more conditions associated with the at least one receiving user equipment; and
selecting at least one sidelink destination related to a logical channel among the at least one receiving user equipment based on the determined sidelink discontinuous reception state and the examination.

10. The method according to claim 9, wherein the sidelink discontinuous reception state comprises one of enabled or disabled.

11. The method according to claim 9, wherein the one or more conditions comprises one or more constraints, and wherein the one or more constraints comprises at least one of:
quality of service related parameters,
a priority of the at least one sidelink destination, or
whether the at least one sidelink destination comprises a sidelink discontinuous reception enabled destination or a sidelink discontinuous reception non-enabled destination.

12. The method according to claim 11, wherein the quality of service related parameters comprise at least one of:
a latency bound comprising whether the at least one receiving user equipment allows for delayed transmission,
a packet delay budget, or
a number of retransmissions.

13. The method according to claim 9, wherein the examination comprises determining whether logical channels have the same priority.

14. The method according to claim 13, further comprising:
when the logical channels have the same priority, determining whether the at least one sidelink destination has sidelink discontinuous reception enabled, and constraints indicating prioritization.

15. The method according to claim 14, further comprising:
selecting a sidelink destination based on the determination.

16. The method according to claim 15, wherein the selection of the sidelink destination based on the determination comprises at least one of:
selection of a prioritized sidelink discontinuous reception enabled destination, or
selection of a sidelink discontinuous reception non-enabled destination or a sidelink discontinuous reception enabled destination based on quality of service parameters.

17. A non-transitory computer readable medium, comprising executable code, which, when executed by a processor, causes the processor to:
determine a sidelink discontinuous reception state of at least one receiving user equipment;
examine one or more conditions associated with the at least one receiving user equipment; and
select at least one sidelink destination related to a logical channel among the at least one receiving user equipment based on the determined sidelink discontinuous reception state and the examination.

18. The non-transitory computer readable medium according to claim 17, wherein the sidelink discontinuous reception state comprises one of enabled or disabled.

19. The non-transitory computer readable medium according to claim 17, wherein the one or more conditions comprises one or more constraints, and wherein the one or more constraints comprises at least one of:
quality of service related parameters,
a priority of the at least one sidelink destination, or
whether the at least one sidelink destination comprises a sidelink discontinuous reception enabled destination or a sidelink discontinuous reception non-enabled destination.

20. The non-transitory computer readable medium according to claim 19, wherein the quality of service related parameters comprise at least one of:
a latency bound comprising whether the at least one receiving user equipment allows for delayed transmission,
a packet delay budget, or
a number of retransmissions.

* * * * *